United States Patent
Wolf

(10) Patent No.: US 9,903,413 B2
(45) Date of Patent: Feb. 27, 2018

(54) PINION BEARING UNIT

(75) Inventor: Thomas Wolf, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 1023 days.

(21) Appl. No.: 12/743,150

(22) PCT Filed: Nov. 14, 2007

(86) PCT No.: PCT/EP2007/009851
§ 371 (c)(1),
(2), (4) Date: Sep. 21, 2010

(87) PCT Pub. No.: WO2009/062530
PCT Pub. Date: May 22, 2009

(65) Prior Publication Data
US 2011/0007992 A1    Jan. 13, 2011

(51) Int. Cl.
| F16C 19/49 | (2006.01) |
| F16C 33/30 | (2006.01) |
| F16C 33/60 | (2006.01) |
| F16H 57/021 | (2012.01) |
| F16C 41/04 | (2006.01) |

(52) U.S. Cl.
CPC .......... *F16C 19/497* (2013.01); *F16C 33/303* (2013.01); *F16C 33/60* (2013.01); *F16C 41/04* (2013.01); *F16H 57/021* (2013.01); *F16C 2240/30* (2013.01); *F16C 2361/61* (2013.01)

(58) Field of Classification Search
USPC ................................. 384/445, 452–455, 494
See application file for complete search history.

(56) References Cited

U.S. PATENT DOCUMENTS

| 4,729,252 A | 3/1988 | Huber et al. |
| 6,135,641 A * | 10/2000 | Smith ........................... 384/493 |
| 6,293,704 B1 * | 9/2001 | Gradu ........................... 384/557 |
| 2006/0204157 A1 * | 9/2006 | Takemura ...................... 384/568 |

(Continued)

FOREIGN PATENT DOCUMENTS

| EP | 1741942 A2 | 1/2007 |
| JP | 63152713 A | 6/1988 |
| JP | 7238926 A | 9/1995 |

(Continued)

OTHER PUBLICATIONS

SKF XP 002492314—SKF General Catalogue—5000E, Passage SKF General Catalogue—5000E, Jan. 1, 2003 SKF DE, (Germany)—pp. 139, 157.

*Primary Examiner* — James Pilkington
(74) *Attorney, Agent, or Firm* — Bryan Peckjian; SKF USA Inc. Patent Department

(57) ABSTRACT

A bearing unit, for supporting a pinion shaft having at one side a pinion head, includes a taper roller bearing and an angular ball bearing, the bearings having a common outer race ring and separate inner race rings. The inner race rings are spaced apart a distance along the pinion shaft, and the taper roller bearing has a contact angle $\alpha$ from 15° to 20° for absorbing mainly the radial force component of the tooth force at the pinion head, and the one-row angular ball bearing has a contact angle $\beta$ of between 35° and 45° for absorbing mainly the axial force coming from the gear mesh and that induced by the taper roller bearing.

8 Claims, 1 Drawing Sheet

(56) References Cited

U.S. PATENT DOCUMENTS

2007/0104403 A1    5/2007  Kawamura et al.

FOREIGN PATENT DOCUMENTS

| JP | 9096352 A | 4/1997 |
| JP | 10009259 A | 1/1998 |
| JP | 2007139020 A | 6/2007 |
| WO | WO9902875 A1 | 1/1999 |
| WO | WO02073051 A2 | 9/2002 |
| WO | WO2005057030 A1 | 6/2005 |

* cited by examiner

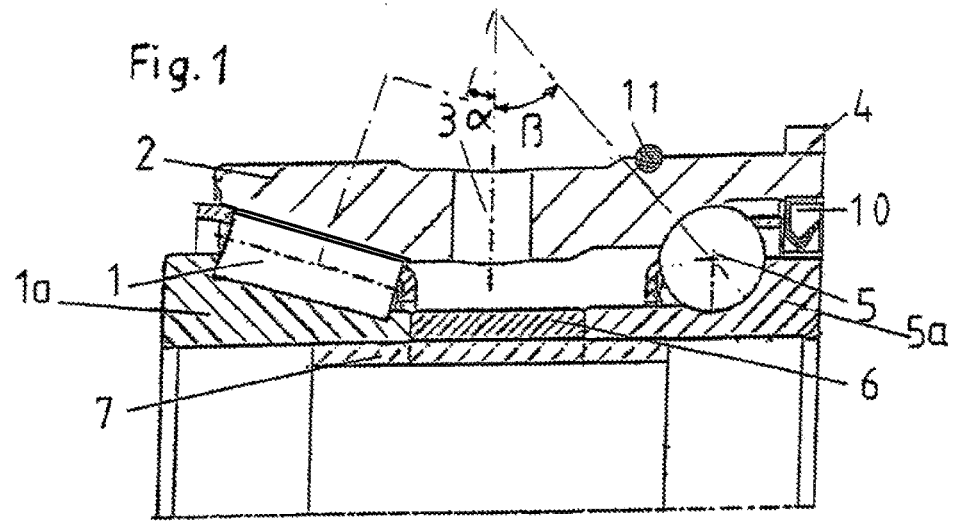
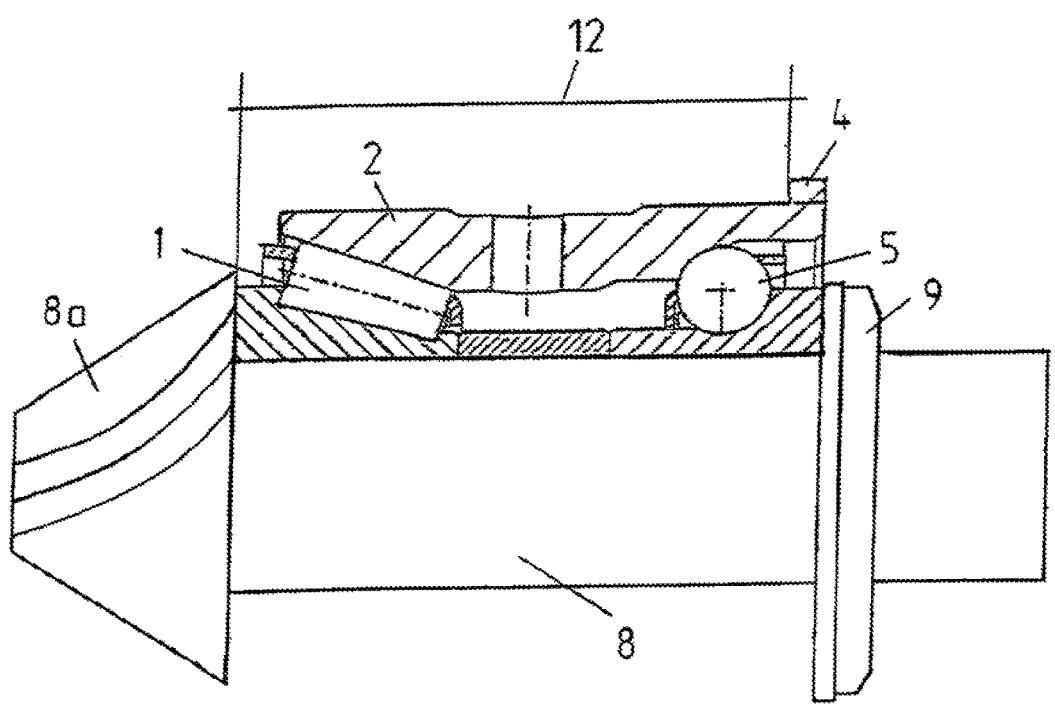

PINION BEARING UNIT

BACKGROUND OF THE INVENTION

The present invention refers to a hybrid pinion bearing unit for use in a motor vehicle front axle differential with negative hypoid offset and also for motor vehicle power transfer units, and the purpose is to provide an application-oriented optimization of the bearing assembly of the pinion shafts in drivelines. In relation to the present drivelines, due to the more and more increasing negative hypoid offset (i.e. the rotational axis of the differential is situated below the corresponding pinion shaft) in the future, in front axle differentials and the conversion of the helical directions associated therewith of the taper drive, the force conditions in the hypoid gearing will also change. Thereby the pinion axle in tractive operation in the future will be pulled into the crown wheel gears. In order to still be able to obtain such a low clearance of the flank of a tooth as possible, it is above all necessary to have a bearing assembly which is optimized for stiffness in axial direction.

Corresponding conditions are at hand at the so called PTUs (power transfer units) for all-wheel driven vehicles, at which the driven pinion axle via the crown wheel transfers its force to the driven driving element, and consequently the axial force has the same effect as described above.

In both cases the force conditions in the tooth engagement between crown wheel and pinion as compared to the conditions which are today common in rear wheel drives, differ thereby that the bearing unit according to the present invention is intended to make it possible to obtain an evident improvement regarding bearing stiffness with a simultaneous clear reduction of the effect of bearing losses.

U.S. Pat. No. 4,729,252 discloses a bearing unit for a pinion gear shaft incorporating a taper roller bearing and an angular ball bearing having a common outer race ring and separate, axially spaced apart inner race rings, and it is stated that the contact lines of the taper roller bearing intersect each other at an angle of less than 90° and that the contact lines of the balls of the angular ball bearing likewise intersect each other at an angle of less than 90°.

The stiffness of such a bearing combination is not optimal in view of the different characteristics for a taper roller bearing and an angular ball bearing.

The purpose of the present invention is therefore to propose a modified bearing unit of this type, whereby the above problems are eliminated, and this is achieved by the invention disclosed and claimed hereinafter.

BRIEF DESCRIPTION OF THE SEVERAL VIEWS OF THE DRAWINGS

Hereinafter, the invention will be further described by way of a preferred embodiment as illustrated in the accompanying drawing, in which:

FIG. 1 illustrates a cross-section through a portion of a pinion bearing unit according to the invention, and FIG. 2 is a corresponding view of a pinion bearing unit as illustrated in FIG. 1, but connected to a pinion shaft.

DETAILED DESCRIPTION OF THE INVENTION

FIG. 1 shows in cross-section the upper half of a pinion bearing unit according to the invention, wherein a two-row bearing unit consists on the pinion head side of a friction optimized taper roller bearing 1 and on the pinion tail side of an angular ball bearing 5. Both rows of bearings have a common one-piece outer race ring 2, in which are provided two opposite oil bores 3 (only one being shown), whereas the inner race rings 1a and 5a, resp. are axially spaced apart by a spacing sleeve 6. At the side of the common outer race ring 1 remote from the pinion head there is provided an external flange 4 for mounting purpose. The bearings 1, 5 are mounted as preloaded bearings in back-to-back relation with an optimized preload with reference to stiffness and friction losses.

In order to obtain such a high bearing stiffness as possible and at the same time a lower bearing friction and reduced effect loss also at extended bearing life span, it is necessary to design the internal bearing geometry in an ideal manner in relation to the requirements.

Thereby is it necessary to utilize the different characteristics of a taper roller bearing and of an angular ball bearing from application technical reasons for reaching the goal.

According to this, the taper roller bearing 1 in an ideal manner is optimized for giving as low friction as possible for absorbing the radial force, which acts as a function of the torque to be transferred in the gears of the pinion head, in that taper roller bearing 1 has a contact angle $\alpha$ from 15° to 20°; for absorbing the axial force component of the tooth force at the pinion head, and for absorbing the axial force induced by the taper roller bearing 1 at the same time the one-row angular ball bearing 5 has a contact angle $\beta$ from 35° to 45°.

A minimum of roller body reaction forces is experienced due to the action obtained by the fact that the two contact angles are of different size, and this has a positive impact on bearing stiffness as well as on the bearing friction losses. The large contact angle of the angular ball bearing provides for an increased carrying capacity and an optimized axial stiffness rate, respectively for the bearing unit.

For further reduction of loss effects and increase of the stiffness of the bearing it is also possible that the angular ball bearing is equipped with balls of ceramic material.

Dependent on the initially described force relationship at the pinion head, the taper roller bearing 1 on the pinion head side is subjected to an axial unloading, which at high operational forces leads to a load zone, limited to only a few taper rollers and a simultaneously essential tilting between the inner and the outer race rings. In order to exclude the risk for impermissible high edge stresses at the rolling contact, the taper rollers are designed with a logarithmic profile at the envelope diameter.

In order to fulfill the requirements for a bearing stiffness as high as possible, at the same time as the bearing friction moment and the bearing effect losses are as low as possible, at the best possible manner in relation to the parameters of the bearing preload, the bearing unit is manufactured a) with consideration of usual fitting conditions between the bearing outer race ring and the housing and between the bearing inner ring and the shaft respectively, and b) with an axial clearance before mounting of 0.03 to 0.07 mm. This leads to an application optimized bearing preload from 2000 to a maximum of 5000 N.

The increasing demand for low friction at simultaneous higher stiffness demand, which is the result of the demand for higher power density, thereby has been taken into account.

As the bearing unit comprising bearing outer race ring 2, inner race rings 1a and 5a and intermediate spacing sleeve 6 are not held together before being assembled, it is shown in FIG. 1 how they for transport purposes can be secured to each other by use of an inner mounting sleeve 7 extending over a portion of each of the inner race rings 1a and 5a and over the intermediate spacing sleeve 6. The dismounting force for the transport sleeve is limited to a maximum of F=100 N.

Optionally it is possible to obtain a reduction of the constructional height tolerances, see 12 in FIG. 2, which leads to an evident reduction of the costs at the adjustment of the tooth flank clearance between pinion and crown wheel.

Further Possibilities:

For increasing the degree of integration it is proposed, to mount a radial shaft sealing ring 10 in the bore of the outer race ring on the side of the angular ball bearing. For use in a light metal housing is also provided an O-ring 11 as a static oil seal. It is also conceivable with the most different designs of a shoulder or a flange respectively, on the outer race ring for transfer of the axial forces to the housing. In FIG. 2 is illustrated the hybrid pinion shaft bearing unit in mounted condition:

Mounting of the bearing unit on the pinion shaft 8 is limited to:
- simultaneous pushing up or pressing up the two inner rings 1a and 5a
- rotating the pinion shaft 8 with the pinion head 8a several times until reaching engagement of the taper rollers against the guide flange on the pinion head 8a,
- tightening the pinion nut 9 with an application specific tightening torque in order to obtain the ideal pretension force.

The invention is not limited to the embodiment shown in the drawings and described with reference thereto, but variants and modifications are possible within the scope of the accompanying claims.

The invention claimed is:

1. A bearing unit configured to support a pinion shaft having a pinion head at one end, the bearing unit, comprising:
   a taper roller bearing and an angular ball bearing, the taper roller bearing having a first inner race ring, the angular ball bearing having a second inner race ring spaced from the first inner race ring by a spacer having a length, and the taper roller bearing and the angular ball bearing having a common outer race ring,
   wherein the taper roller bearing has a contact angle within a range of about 15° to about 20° and the angular ball bearing has a contact angle within a range of between about 35° and about 45°, and
   wherein a first end of the spacer is in direct contact with the first inner race ring and a second end of the spacer is in direct contact with the second inner race ring, and
   wherein the length is selected such the bearing unit has an axial clearance before mounting of 0.03 mm to 0.07 mm when the first inner race ring, the spacer and the second inner race ring are in mutual contact.

2. The bearing unit as claimed in claim 1, wherein each of the angular ball bearing and the taper roller bearing has a plurality of rolling bodies and the rolling bodies of at least one of the angular ball bearing and the taper roller bearing are made of a ceramic material.

3. The bearing unit as claimed in claim 1, wherein rollers of the taper roller bearing have a logarithmic profile for reducing edge pressure.

4. The bearing unit as claimed in claim 1, wherein the common outer race ring has opposing axial ends and the bearing unit further comprises a sealing member fitted to the outer race ring on the end opposed to the pinion head.

5. The bearing unit as claimed in claim 1, wherein the common outer race ring has an outer envelope surface and a circumferential groove in the outer envelope surface and the bearing unit further comprises a sealing member disposed within the circumferential groove in the common outer race ring, the sealing member being configured to provide a static oil seal against an inner wall of a surrounding housing.

6. The bearing unit as claimed in claim 1, including an inner mounting sleeve securing the first and second inner race rings and the spacer.

7. The bearing unit as claimed in claim 1, including an inner mounting sleeve releasably securing the first and second inner race rings to the spacer.

8. The bearing unit as claimed in claim 1, wherein the axial clearance comprises an axial space between a roller of the taper roller bearing and the outer race ring or an axial space between a ball of the angular ball bearing and the outer race ring or a combination of the axial space between the roller of the taper roller bearing and the outer race ring and the axial space between the ball of the angular ball bearing and the outer race ring.

* * * * *